United States Patent [19]

Tindell

[11] Patent Number: 5,713,537
[45] Date of Patent: Feb. 3, 1998

[54] BLOCKERLESS THRUST REVERSER

[75] Inventor: Runyon H. Tindell, Old Bethpage, N.Y.

[73] Assignee: Northrop Grumman Corporation, Los Angeles, Calif.

[21] Appl. No.: 570,421

[22] Filed: Dec. 11, 1995

[51] Int. Cl.⁶ .................................................. B64D 33/04
[52] U.S. Cl. .............................. 244/110 R; 239/265.17; 60/226.2
[58] Field of Search ................. 244/110 R; 239/265.17; 60/226.2, 230

[56] References Cited

U.S. PATENT DOCUMENTS 3,048,974  8/1962  Bertin et al. ................. 239/265.17

FOREIGN PATENT DOCUMENTS 669492   8/1963  Canada ........................... 239/265.17
1030483  6/1953  France ........................... 239/265.17

*Primary Examiner*—Galen L. Barefoot
*Attorney, Agent, or Firm*—Terry J. Anderson; Karl J. Hoch, Jr.

[57] ABSTRACT

This specification relates to a blockerless thrust reverser for an aircraft having a podded nacelle housing a turbofan engine which produces core flow and a fan exit stream. Reverse thrust is obtained by diverting the fan exit stream into an annular slot formed in an outer wall of the nacelle where it is turned and discharged forward. The fan exit stream is directed into the annular slot by injecting high pressure streams of core flow into the fan exit stream at positions which are upstream of and adjacent to the annular slot. Reverse thrust is selectively obtained by a control means which selectively opens and closes the annular slot and the core jet injectors.

10 Claims, 2 Drawing Sheets

BLOCKERLESS THRUST REVERSER

BACKGROUND OF THE INVENTION

1. Field of the Invention

The present invention relates generally to a thrust reverser, and more particularly, to a blockerless thrust reverser for an aircraft having a podded nacelle housing a turbo-fan engine.

2. Description of the Prior Art

Existing thrust reversers require a mechanical blocker device to divert the normally aft-flowing fan stream and turn it outward prior to being discharged from the aircraft in a forward direction. The blocker sustains very large loads, is heavy, and the associated mechanisms incur stowage, maintenance, internal performance and reliability penalties. Thrust reversing is typically accomplished by deploying large clamshell-like or segmented annular doors to block the fan flow turning it outward and forward, possibly assisted by guide vanes. These load-bearing surfaces are heavy, incur a high parts count due to variable positioning and stowage, and cause performance penalties during stowed operation due to total pressure and leakage losses. Although the thrust reverser system is used for only a fraction of the airplane operating time, its impact on nacelle design, weight, airplane cruise performance, engine maintenance and aircraft operating expense is significant.

An engine company study indicates that a thrust reverser system accounts for more than 30 percent of total nacelle weight (not including the engine) for an engine with a fan diameter greater than 100 in. This can be as much as 1,500 lb for a GE90 class engine. Estimated thrust reverser weight is on the order of 55 percent of total nacelle weight for a Folker F100 or Gulfstream GV type installation. This accounts for approximately 600 to 800 lbs. of the nacelle weight. In addition, due to leakage and pressure drops attributed to thrust reverser mechanisms, thrust reverser systems have been estimated to increase specific fuel consumption (SFC) by 0.5 to 1.0 percent. This significantly increases the cost of doing business for commercial operators.

High by-pass ratio engines installed on aircraft such as the 737, 747, 767, 777, DC10, MD11 and A300 use fan stream cascade vane thrust reversers which reverse the fan stream to provide reverse thrust. Generally, core flow is not reversed, due to the complexities and unreliability associated with reversing the core flow. The reversed fan stream provides sufficient reverse thrust in most cases.

The fan stream thrust reverser consists of a series of cascade vanes located around the periphery of the fan cowling aft of the fan exit guide vanes. A series of blocker doors isolates the cascade vanes from the fan stream in forward thrust, while a translating cowl covers the external surface of the cascade vanes of providing a smooth exterior surface for low drag. On actuation, a mechanical drive system translates the outer cowling aft, exposing the cascade vanes external surfaces, while at the same time pivoting the internal blocker door aft on links attached to the core cowling, blocking the fan flow and reversing it through the cascade vanes. With the thrust reverser stowed, engine performance penalties result from leakage round the stowed blocker doors, as well as scrubbing drag associated with blocker door actuating links.

A fixed pivot thrust reverser is used with engines that incorporate a compound nozzle exhaust system, that is, a single nozzle for combined core and fan flow. This type of reverser is used on executive and small commercial aircraft, such as the Falcon 10/20/30, Saberliner, Gulfstream GIV Executive and Folker F100/F70 Regionaliner. The fixed pivot thrust reverser consists of two target doors that are integral with the nacelle aft cowl assembly. The stowed reverser forms the external boattail of the nacelle and also the internal shape of the exhaust nozzle. Internal joints of the stowed reverser nozzle employ seals to minimize leakage in forward thrust mode. For operation in reverse mode, the reverser doors pivot aft to form a target that blocks and turns the combined core and fan flow to produce the desired reverser reaction force. The target is located far enough behind the jet-pipe exit to minimize suppression (back pressure) of the engine turbine exhaust and fan flows. The doors generally include end plates to assist in turning the reversed flow. Pivoting of the doors between the stowed and deployed positions is by means of a pushrod to each door driven by a single bellcrank idler that keeps the door motions synchronized. The bellcrank is powered by a hydraulic actuator.

Mechanical blockers employed by known thrust reversers cause in-flight engine performance penalties because they are heavy in weight, require stowage which increases nacelle drag, and cause pressure losses to the fan flow due to inefficient seals between the blockers and the main body. In addition, mechanical blockers sustain very large loads and have a high parts count which decreases reliability and increases the need for maintenance. Thus, thrust reversers employing mechanical blockers cause significant increases to operating and maintenance costs of an aircraft.

SUMMARY OF THE INVENTION

The present invention is directed to a blockerless thrust reverser for an aircraft having a podded nacelle housing a turbo-fan engine which produces a core flow and a fan exit stream. Reverse thrust is obtained by discharging the fan exit stream out of an annular slot formed in an outer wall of the nacelle. The fan exit stream is directed into the annular slot by means of multiple annular core jet injectors which inject high pressure streams of core flow into the fan exit stream. There must be at least two core jet injectors distributed within an axial region on the core nacelle. The axial region is defined by an area adjacent to and somewhat upstream of the annular slot. The injectors are positioned to intersect the fan exit stream at various angles, thereby directing the fan stream into the annular slot. Any number of injectors may be used to optimize the desired effect.

In addition, the present invention utilizes a Coanda surface to turn the fan exit stream into the annular slot. A Coanda surface is a geometric structure with a shape defined by a mathematical curve called a lemniscate. A fluid stream flowing over a Coanda surface tends to adhere to that surface, therefore, relatively separation-free turning of the fluid stream can be accomplished. In the present invention, implementing a Coanda surface at the forward convex surface of the annular slot will help the fan exit stream turn into the annular slot.

The present invention is also directed to a method of thrust reversing an aircraft having a podded nacelle housing a turbo-fan engine producing a fan exit stream without the use of mechanical blockers. The first step is to form an annular slot in an outside wall of the nacelle. Next, the fan exit stream is directed into the annular slot by injecting high pressure streams of core flow into the fan exit stream upstream of and adjacent to the annular slot. Finally, the fan exit stream is discharged out of the annular slot in a forward direction.

The principle object of the present invention is to provide a thrust reverser for an aircraft which does not utilize mechanical blockers. Mechanical blockers are eliminated by the novel use of multiple core jet injectors and Coanda surfaces to turn the fan exit stream.

Another object of the present invention is to provide a thrust reverser which reduces in-flight engine performance losses that are present in known thrust reversers. In the present invention in-flight fan thrust increased and specific fuel consumption (SFC) is reduced by reducing total pressure losses and leakage associated with stowage of mechanical blockers.

Another object of the present invention is to provide a thrust reverser which has a simpler structure than known thrust reversers. The structure is lighter in weight, has a low parts count, requires no stowage and is more efficiently packaged in the nacelle.

A further object of the present invention is to provide a thrust reverser which is more reliable than known thrust reversers. In the present invention, there are no parts which are deployed directly in the path of the fan exit stream, thus the parts do not sustain large loads. Small loads reduce the possibility of part failures and, therefore, increase reliability. In addition, the lower parts count increase reliability.

A further object of the present invention is to provide a thrust reverser which is more cost efficient than known thrust reversers. The present invention is more cost efficient than known thrust reversers because SFC is reduced due to lower fan thrust loss and lower nacelle weight. Reduced SFC significantly reduces the cost of aircraft operation. In addition, the simple structure and low parts count of the present invention reduces costs in manufacturing and maintaining the engine.

Another object of this invention is to utilize an "efficient" Coanda surface, nacelle geometry permitting, to provide relatively loss-free turning of the fan stream into the annular slot. Fundamental fluid mechanics dictate that relatively loss-free turns through large angles can be accomplished when the height of the fluid stream is small compared to the radius of the turning surface. Thus, in a turbo-fan engine with a fan nacelle having an outer wall with a thickness that is sufficient to provide an "efficient" Coanda surface, loss-free turning of the fan stream into the annular slot can be accomplished.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENT

Figure 1:
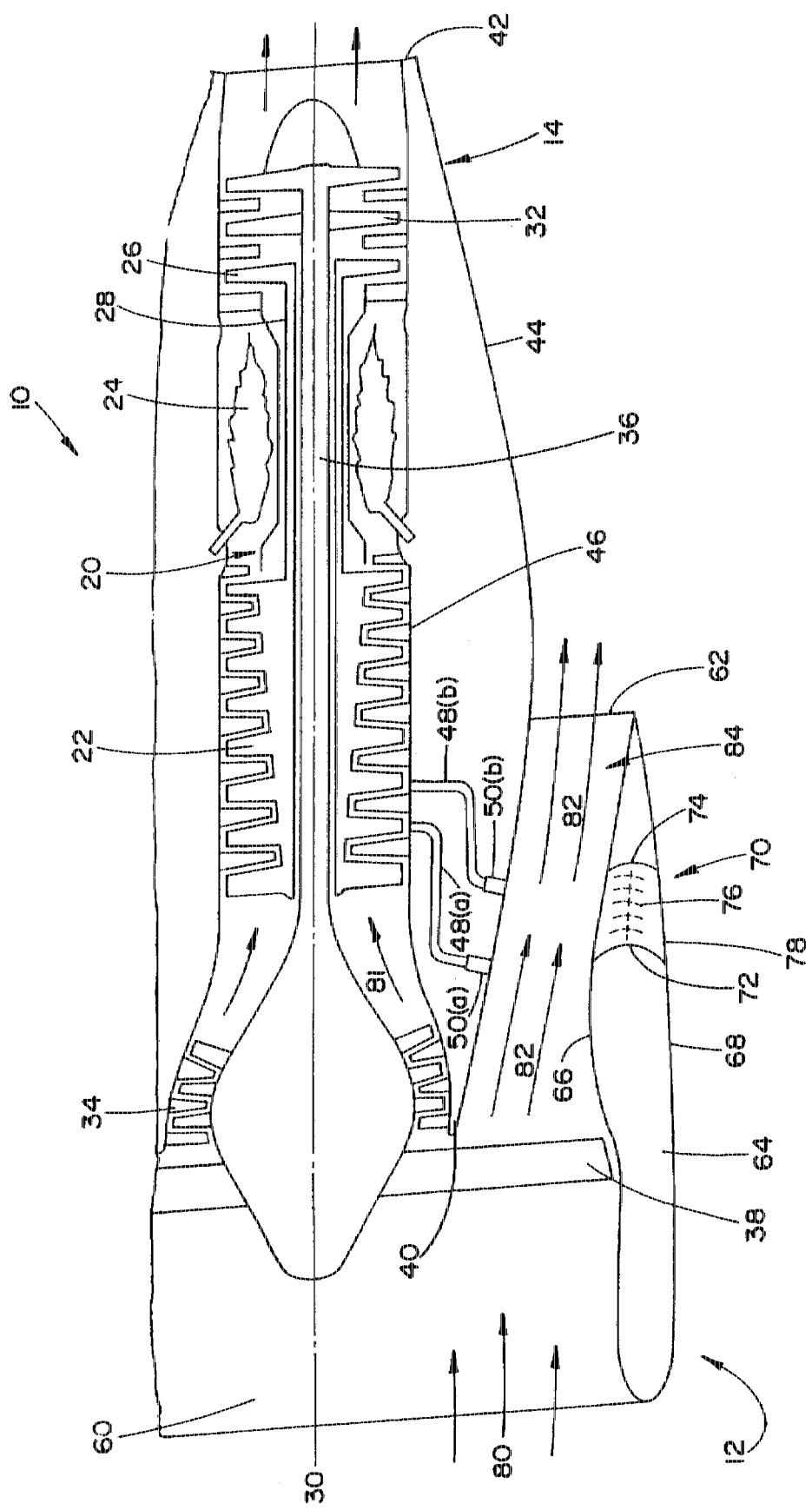
FIG. 1 shows an embodiment of the present invention in forward thrust mode.
Figure 2:
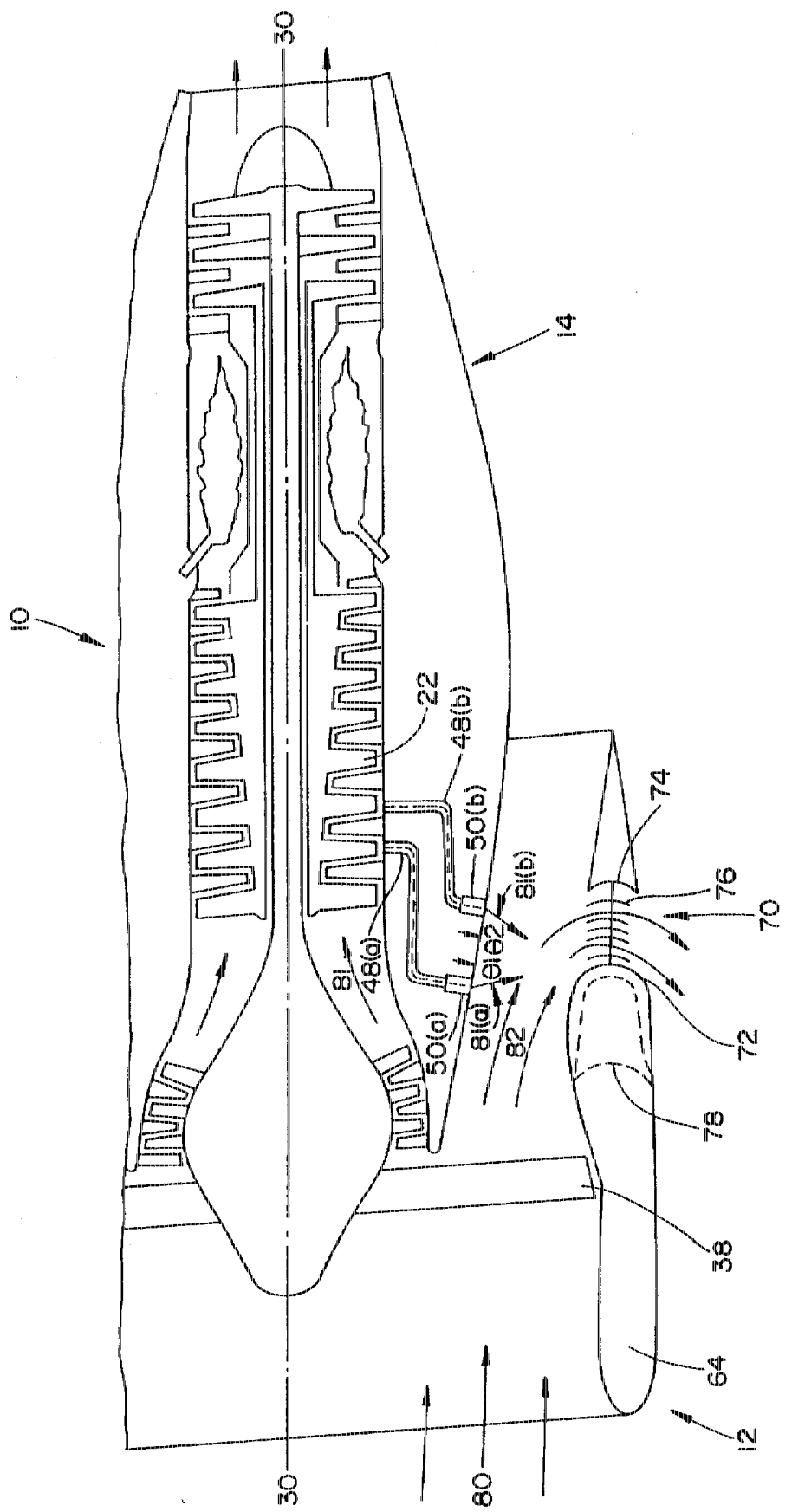
FIG. 2 shows an embodiment of the present invention in reverse thrust mode.

FIGS. 1 and 2 show a preferred embodiment of the present invention as implemented in an aircraft having a turbofan engine 10 housed in a podded nacelle comprising a fan nacelle 12 and a core nacelle 14.

The core nacelle 14 houses a core engine 20 comprising, a high pressure compressor 22, a combustor 24 and a high pressure turbine 26 all arranged in a serial, axial flow relationship. A larger diameter annular drive shaft 28, disposed coaxially about a centerline 30 of the turbofan engine 10, fixedly interconnects the high pressure compressor 22 and the high pressure turbine 26.

The core nacelle 14 further houses a low pressure turbine 32 and a low pressure compressor 34 called a booster. Both the low pressure turbine 32 and the low pressure compressor 34 are fixedly attached to a smaller diameter annular drive shaft 36 which is disposed coaxially about the centerline 30 of the engine 10 within the larger diameter annular drive shaft 28. A fan 38 including a row of generally radially outwardly extending fan rotor blades (not shown) is fixedly attached to the smaller diameter annular drive shaft 36.

The core engine 20, the low pressure turbine 32 and the low pressure compressor 34 are surrounded by the core nacelle 14 which supports the drive shafts 28 and 36 by bearings (not shown). The core nacelle 14 is disposed longitudinally aft of the fan 38 and has a longitudinally forward end defining a flow splitter 40 and a longitudinally aft end defining a core nozzle 42. The core nacelle 14 has an outer core surface 44 facing generally radially outward and an inner core surface 46 integrally surrounding the core engine 20, the low pressure turbine 32 and the low pressure compressor 34. Two passageways, 48(a) and 48(b), are formed through the core nacelle 14 from the inner core surface 46 to the outer core surface 44 connecting the high pressure compressor 22 to a first core jet injector 50(a) and a second core jet injector 50(b). Core jet injectors 50(a) and 50(b) are primarily annular in shape and have a nozzle control (not shown) which can selectively open and close injectors 50(a) and 50(b).

The fan nacelle 12 circumferentially surrounds the fan 38 and at least a portion of the core nacelle 14. The fan nacelle 12 is supported about the core nacelle by a plurality of support members (not shown). The fan nacelle 12 has a longitudinally forward end defining an ambient air intake 60, a longitudinally aft end defining a fan nozzle 62, and an outer wall 64 including an inner exterior surface 66 facing generally radially inward and an outer exterior surface 68 facing generally radially outward. An annular slot 70 is formed through the outer wall 64 of the fan nacelle 12 connecting the surfaces 66 and 68. The annular slot 70 has a convex forward surface 72 and a concave aft surface 74. A series of turning vanes 76 are positioned within the annular slot 70. The convex forward surface 72 is a Coanda surface defined by a mathematical curve called a lemniscate which supports loss free turning of fluid streams through large angles. The annular slot 70 has a movable cover 78 which when deployed, as in FIG. 1, closes the annular slot 70 and covers the turning vanes 76. The cover 78, when retracted as in FIG. 2, is housed within the outer wall 64 of the fan nacelle 12.

The core engine 20 generates combustion gases. Pressurized gas from the high pressure compressor 22 is mixed with fuel in the combustor 24 and ignited, thereby generating combustion gases. Some energy is extracted from these gases by the high pressure turbine 26 which drives the high pressure compressor 22. The remainder of the combustion gases are discharged from the core engine 20 into the low pressure turbine 32 which rotates the smaller diameter drive shaft 36 and the fan 38. After flowing through the high pressure turbine 26 and the low pressure turbine 32 the combustion gases are discharged out of the core nozzle 42 in an aft flowing direction.

FIG. 1 shows the turbofan engine 10 as it operates in forward thrust mode. The movable cover 78 is deployed thereby closing the annular slot 70, and core jet injectors 50(a) and 50(b) are closed. The combustion gases generated by the core engine 20 rotate the low pressure turbine 32 which rotates the fan 38 thereby drawing ambient air 80 into the ambient air intake 60. The ambient air 80 is drawn through the fan 38 toward the flow splitter 40 which directs some of the air, called the core flow 81, into the core engine 20. The remaining air, called the fan exit stream 82, is directed into a flow path 84 located between the outer core surface 44 of the core nacelle 14, and inner exterior surface 66 of the outer wall 64 of the fan nacelle 12. The aft flowing fan exit stream 82 flows through the flow path 84, over the cover 78 covering the annular slot 70 and is then discharged out of the fan nozzle 62 in an aft flowing direction thereby creating forward thrust.

In addition, core flow 81 is directed into core engine 20, where it is compressed, mixed with fuel and ignited thereby creating combustion gases that exit through the core nozzle 42 and generate additional forward thrust.

FIG. 2 shows the turbofan engine 10 in reverse thrust mode. The cover 78 is retracted into the outer wall 64 of the fan nacelle 12 thereby opening the annular slot 70 and exposing the turning vanes 76. Core jet injectors 50(a) and 50(b) are open, therefore, two high pressure streams of core flow, 81(a) and 81(b), are extracted from the high pressure compressor 22 and are directed through passageways 48(a) and 48(b) to injectors 50(a) and 50(b) where they are injected into the fan exit stream 82 at angles θ1 and θ2. The first core jet injector 50(a) is positioned upstream of the annular slot 70 and its high pressure stream of core flow 81(a) forces most of the fan exit stream 82 toward the annular slot 70. The second core jet injector 50(b) is positioned directly across from the annular slot 70 and its high pressure stream of core flow 81(b) supplements high pressure stream 81(a) and forces most of the fan exit stream 82 into the annular slot 70.

The fan exit stream 82 flowing over the convex Coanda surface 72 tends to adhere to the Coanda surface 72 and turn into the annular slot 70. Thus, the Coanda surface 72 helps core jets 50 and 52 direct the fan exit stream 82 into the annular slot 70.

When the fan exit stream 82 enters the annular slot 70 it is turned forward by the turning vanes 76 and the concave aft surface 74. The fan exit stream 82 is then discharged out of the annular slot 70 in a forward direction thereby generating reverse thrust.

While several embodiments and variations of the present invention are described in detail herein, it should be apparent that the disclosure and teachings of the present invention will suggest many alternative designs to those skilled in the art.

What is claimed is:

1. A thrust reverser for an aircraft which does not utilize mechanical blockers comprising:

a. said aircraft including a podded nacelle having a fan nacelle and a core nacelle, and housing a turbofan engine producing a core flow and a fan exit stream;

b. an annular slot formed through an outer wall of said fan nacelle for turning forward and discharging said fan exit stream and part of the core flow, said annular slot having a forward surface and an aft surface connecting an inner exterior surface to an outer exterior surface of said outer wall, wherein said forward surface is a convex Coanda surface geometrically defined by a mathematical curve called a lemniscate, wherein said fan exit stream adheres to said convex Coanda surface to result in relatively separation-free turning thereof into said annular slot, and said aft surface is a concave surface;

c. a core jet injector means housed in said core nacelle for injecting part of the core flow into said fan exit stream thereby directing said fan exit stream and said part of the core flow into said annular slot, wherein said core jet injector means comprises at least a first core jet injector positioned upstream of the center of said annular slot, and a second core jet injector positioned downstream of the first core jet injector; and d. a control means for selectively opening and closing said annular slot and for selectively opening and closing said core jet injector means, thereby providing selective thrust reversal.

2. The thrust reverser according to claim 1, wherein said first and second core jet injectors are positioned at different angles relative to said fan exit stream thereby injecting said part of the core flow into said fan exit stream at different angles.

3. The thrust reverser according to claim 2, wherein a cascade of turning vanes is mounted within said annular slot, said turning vanes being aligned in a direction consistent with said convex forward surface, wherein the fan exit stream directed into said annular slot is turned forward and discharged by said cascade of vanes.

4. The thrust reverser according to claim 3, further comprising a cover movably mounted in said outer wall for opening and closing said annular slot.

5. The thrust reverser according to claim 4, wherein said control means selectively moves said cover to open and close said annular slot.

6. The thrust reverser according to claim 5, wherein said control means simultaneously opens said cover and said core jet injector means, thereby injecting said part of the core flow into said fan exit stream and directing said fan exit stream and said part of the core flow into said annular slot for turning forward and discharging to provide reverse thrust.

7. The thrust reverser according to claim 1, wherein a cascade of turning vanes is mounted within said annular slot, said turning vanes being aligned in a directed consistent with said convex forward surface, wherein the fan exit stream directed into said annular slot is turned forward and discharged by said cascade of vanes.

8. The thrust reverser according to claim 1, further comprising a cover movably mounted in said outer wall for opening and closing said annular slot.

9. The thrust reverser according to claim 8, wherein said control means selectively moves said cover to open and close said annular slot.

10. The thrust reverser according to claim 9, wherein said control means simultaneously opens said cover and said core jet injector means, thereby injecting said part of the core flow into said fan exit stream and directing said fan exit stream and said part of the core flow into said annular slot for turning forward and discharging to provide reverse thrust.

* * * * *